(No Model.)
S. G. McFARLAND.
WATER CLOSET.
No. 287,558. Patented Oct. 30, 1883.
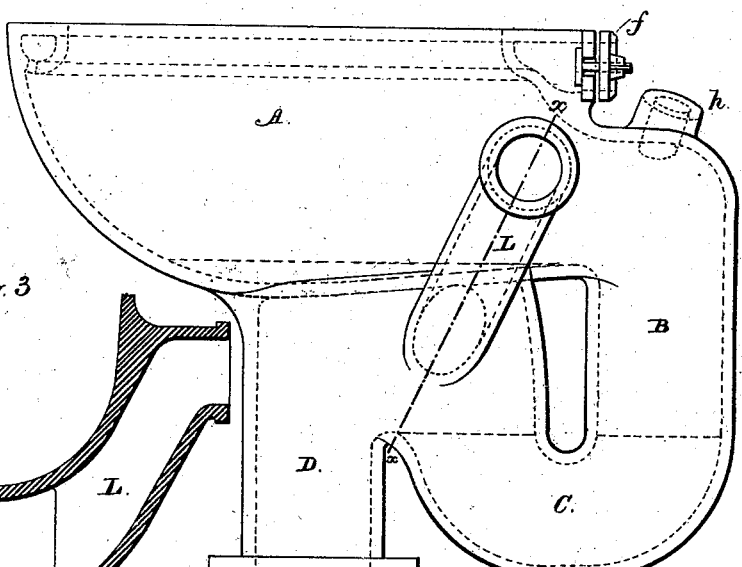
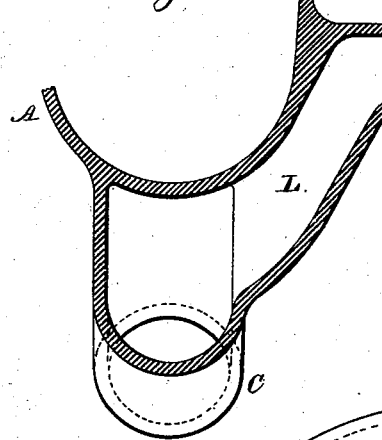
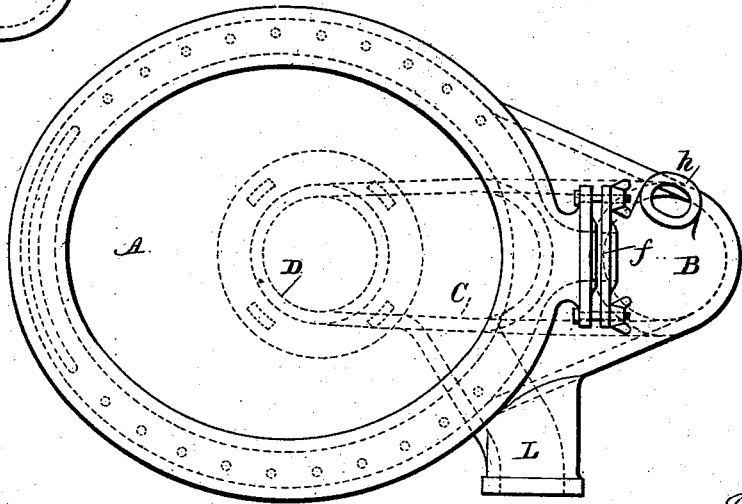
Witnesses:
J. Staib
Chas. H. Smith
Inventor.
Samuel G. McFarland
per Lemuel W. Serrell
atty.

UNITED STATES PATENT OFFICE.

SAMUEL G. McFARLAND, OF NEW YORK, N. Y., ASSIGNOR TO THE J. L. MOTT IRON WORKS, OF SAME PLACE.

WATER-CLOSET.

SPECIFICATION forming part of Letters Patent No. 287,558, dated October 30, 1883.

Application filed April 9, 1883. (No model.)

*To all whom it may concern:*

Be it known that I, SAMUEL G. McFARLAND, of the city and State of New York, have invented an Improvement in Water-Closets, of which the following is a specification.

This improvement relates to the water-closets in which the basin and the trap beneath it are made in one piece, of porcelain; and the special object in view is the connecting of a ventilation-pipe to the trap at the top of the leg that is connected with the soil-pipe, so as to ventilate the soil-pipe and prevent the water being siphoned out of the trap, and at the same time to prevent the ventilating-pipe occupying more space than absolutely necessary, and also giving access to the soil-pipe and to the back of the trap without removing the fittings of the closet or disturbing the closet itself, it only being necessary to disconnect the ascending ventilating-pipe from the porcelain portion of the closet for this purpose, so that a wire can be introduced into the soil-pipe or into the back of the trap, if necessary.

In the drawings, Figure 1 is a side view of the closet. Fig. 2 is a plan of the same, and Fig. 3 is a section at the line $x\,x$ of the branch pipe for ventilation.

The basin A, discharge-pipe B, trap C, and leg D are all formed together, of earthenware or porcelain, and the leg D forms a rest or support for the basin. The water-way for the flushing of the basin is formed as a tubular rim around said basin, with slots and holes. This feature is not claimed herein, as it forms the subject of a separate application. The clamp $f$ serves for fastening to place the water-supply pipe. The nipple $h$ is for receiving the lower end of a ventilating-pipe that rises above the basin and passes to the external atmosphere, for conveying away any odors from the basin or room.

Beneath the basin, above the trap, and between the trap and the vertical leg connecting with the sewer-pipe, there is a ventilating-pipe, L, that opens through the porcelain wall at the side of and above the trap, and follows around the junction between the basin and the discharge-pipe B, and terminates as a short pipe or nipple, to which a metallic or other pipe is connected for conveying to the ventilating-pipe any odors from the soil-pipe, and to admit into such pipe the atmosphere, so that water in the trap will not be siphoned out by the rush of water down the soil-pipe. This ventilating-pipe L is made with the other portions of the porcelain basin and trap, it occupies but little space, and the closet can be placed in the same location that ordinary closets would occupy. In case access is needed to either the soil-pipe or the back of the trap, it may be had by uncoupling the ventilator-pipe, so that a wire or other implement may be introduced, to remove any obstruction. This same closet may be made in cast-iron and enameled, the general shape and mode of construction remaining unaltered. The closet may be made with the ventilating-pipe L at the other side of the basin to that shown, or it may be at both sides, so as to form the most direct connection with the ventilating-pipe.

I do not claim a basin with a trap beneath it, and a ventilating-pipe at the top of the trap beneath the basin. In this case it is difficult to make a connection for the ascending pipe beneath the basin, and the basin is unnecessarily elevated. In my improvement the ventilating-pipe L, passing down the side of the basin, enables the water-closet basin to rest directly upon the trap, making the same much stronger and more compact than heretofore.

I do not herein claim a water-closet in which the trap is beneath the basin, and in which there are one or more lateral ventilating openings from the upper part of the leg that connects with the sewer-pipe, as such a device is shown in another application made by me.

I claim as my invention—

A water-closet basin, A, having a discharge-pipe, B, a trap, C, leg D, and a pipe, L, passing down at the side of the basin, and opening at the lower end into the upper part of the leg D above the outlet or back part of the trap, substantially as set forth.

Signed by me this 6th day of April, A. D. 1883.

SAMUEL G. McFARLAND.

Witnesses:
GEO. T. PINCKNEY,
CHAS. H. SMITH.